Oct. 24, 1961 G. BRUCK 3,005,959
SIGNAL GENERATOR SYSTEM
Filed Aug. 25, 1959
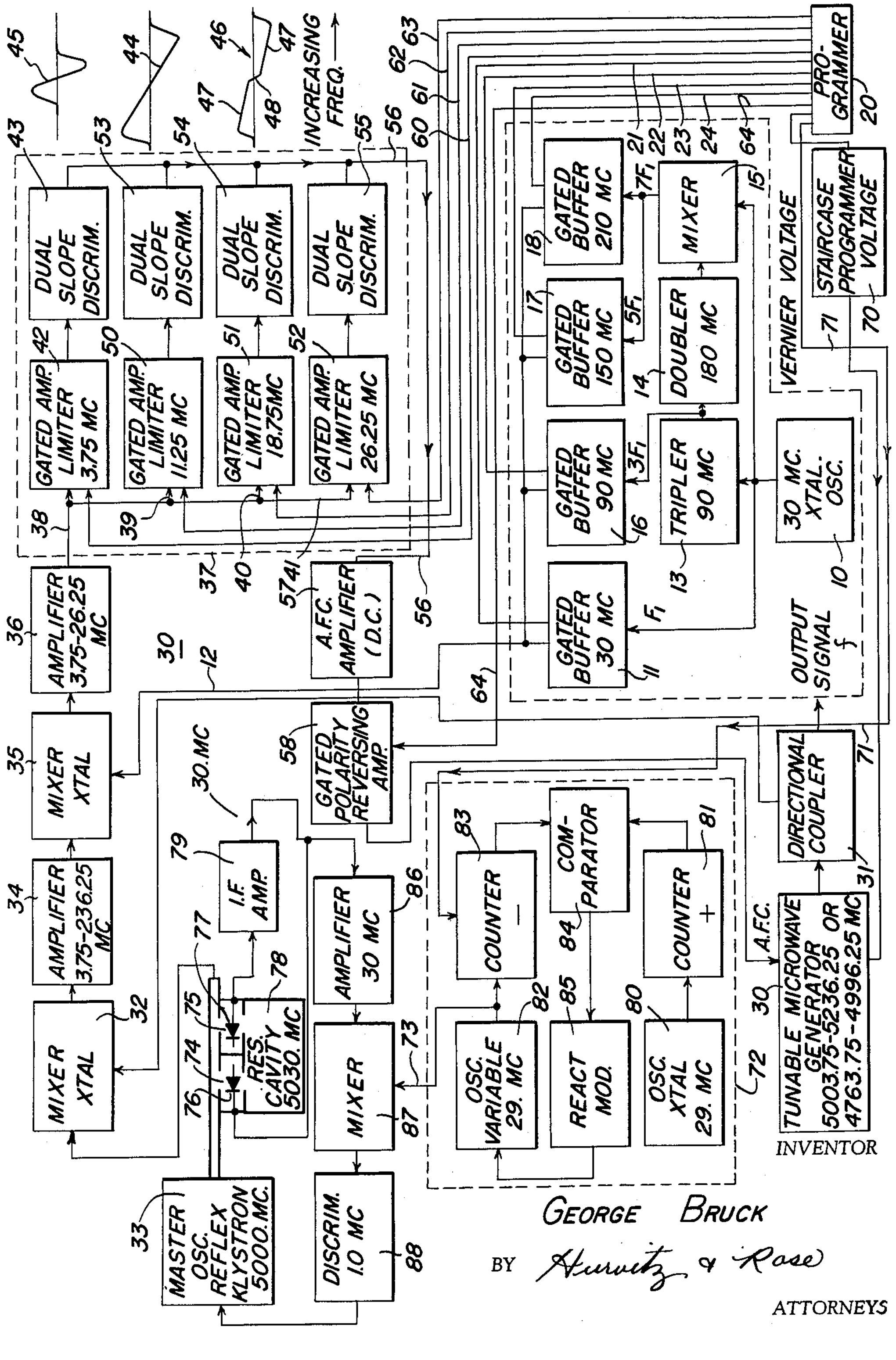
INVENTOR
GEORGE BRUCK
BY Hurvitz & Rose
ATTORNEYS

United States Patent Office 3,005,959

Patented Oct. 24, 1961

3,005,959

SIGNAL GENERATOR SYSTEM

George Bruck, Wyoming, Ohio, assignor to Avco Corporation, Cincinnati, Ohio, a corporation of Delaware Filed Aug. 25, 1959, Ser. No. 835,911
6 Claims. (Cl. 331—11)

The present invention relates generally to signal generators, and more particularly to signal generator systems arranged to provide signals at a large number of accurately controlled and widely distributed frequencies, at will, or in accordance with a predetermined time schedule.

Briefly describing a preferred embodiment of the present invention, a master oscillator supplies a highly stable frequency F. The frequency F is mixed in a first mixer with the output of a primary signal generator, the frequency $f$ of which it is desired to control by plural small increments $\pm n\Delta f$, over a range of values of $n$, where $n$ is an integer. There may be thus generated by the first mixer difference frequencies $F-f$ or $f-F$, according to whether $f$ is greater than or smaller than F. A plurality of further fixed frequency oscillators is provided, which preferably provide exemplary fixed reference frequencies $F_1$, $3F_1$, $5F_1$, $7F_1$ . . . respectively, i.e., frequencies $mF_1$, where $m$ are odd integers having a difference of two. In the general case $m$ may have a minimum value of either 0 or 1, so that an alternative set of exemplary fixed frequencies may be $2F_1$, $4F_1$, $6F_1$, . . . . These frequencies may be selected one at a time by an automatic programmer, or at will, and supplied to a further mixer, to which is also supplied the frequencies $f-F$ or $F-f$, and selected values of output frequency derivable from the second mixer are equal to the difference between $mF_1$ and $f-F$ or $F-f$. A series of frequency discriminators is provided in cascade with the further mixer, having exemplary center frequencies of $\Delta f$, $3\Delta f$, $5\Delta f$, $7\Delta f$, which are subject to selection one at a time by an automatic programmer, or at will, and the selected one of which supplies A.F.C. voltage to control the frequency of the primary oscillator to have any one of a set of values of frequency equal to $F\pm n\Delta f$. Additional values of output frequency may be introduced, separated from those above specified by adding or subtracting increments of frequency $y\Delta a$ to the frequency F, where $y$ assumes integral values and $\Delta a$ is a frequency increment much smaller than $\Delta f$.

The frequency discriminators, or the selected one of these, provides automatic frequency control (A.F.C.) signal to the primary oscillator, to maintain the frequency of the latter accurately at each value pre-selected by the programmer. The A.F.C. signal is applied to the primary oscillator via a gated polarity reversing amplifier, which may be controlled by the programmer to provide A.F.C. voltage of selectively opposite polarities in response to signal output from any frequency discriminator. Thereby, each frequency discriminator establishes two control frequencies for each polarity of A.F.C. voltage.

The values of fixed reference frequencies selected, i.e., $mF_1$, are not inherently limited to four, and that number may be increased by obvious extension of the principles of the invention. Additionally, another set of values than that above suggested as exemplary may be employed for the fixed frequencies, i.e., instead of $F_1$, $3F_1$, $5F_1$, . . . it is possible to employ 0, $2F_1$, $4F_1$, $6F_1$, . . . .

The total number of frequencies available to the system within any specified frequency limits may be extended by utilizing additional discriminators, or discriminators with closer separations between the center frequencies than those specified herein. The frequency range of the system may be increased by increasing the number of fixed reference frequency oscillators at frequencies $mF_1$, to increase the upper and lower frequency limits of the system, and additional frequency increments may be established by providing control of the frequency of the master oscillator, at nominal frequency F, to have further calues of $F\pm\Delta a$, $F\pm2\Delta a$ . . . .

A multiple frequency generator according to the invention provides, thus, a large number of discrete frequencies, adjacent pairs of which have equal separations throughout, and any one of the entire gamut of available frequencies being selectable at will in response to a limited number of control signals. For example, by provision for gating at will of four discriminators, four fixed frequency oscillators and two A.F.C. polarities, thirty-two frequencies become available above a reference value provided by a master oscillator and the same thirty-two frequencies below that reference value. Moreover, by including a master oscillator which is stepwise tunable, say in $y$ steps, the number of frequencies available becomes $32y$. More generally, if D is the number of frequency discriminators available, O the number of fixed frequency oscillators, and $y$ the number of increments of frequency available to the master oscillator, the total number of frequencies available to the system, above and below a reference value, is $DOy$.

It is essential to maximum utilization of the system that the frequency discriminators all have center frequencies less than the largest common factor of the fixed oscillator frequencies, $F_1$, that they be equally spaced both from zero frequency and from $F_1$, by a frequency factor $\Delta f$, and that they be separated from each other by $2\Delta f$. So for $F_1=30$ mc., a basic frequency increment $\Delta f$ of 2.5 mc. could be employed, provided the set of frequency discriminators have center frequencies of 2.5 mc., 7.5 mc., 12.5 mc., 17.5 mc., 22.5 mc., 27.5 mc., although in the preferred embodiment described herein values of 3.75 mc., 11.25 mc., 18.75 mc., and 26.75 mc., are in fact employed, $\Delta f$ being equal to 3.75 mc.

The fixed reference frequencies such as $F_1$ and $3F_1$ are spaced by 60 megacycles, and in the illustrative embodiment shown they are therefore spaced by a quantity equal to $2z\Delta f$. $z$ in the particular case shown is equal to 8.

It is, accordingly, a broad object of the present invention to provide a novel generator of multiple precisely spaced frequencies.

It is another object of the invention to provide a system for generating a large number of equally spaced frequencies, which employs a limited number of fixed frequency oscillators and a limited number of frequency discriminators.

It is a further object of the invention to provide a system for generating frequencies at will, without ambiguity, by selecting one of a plurality of reference oscillators and one of a plurality of frequency discriminators.

A further object of the present invention resides in the provision of a system for automatically controlling the frequency of an oscillator over a pair of values, in response to an automatic volume control voltage developed by a single frequency discriminator, by selective reversal of the polarity of that voltage.

It is another object of the invention to provide a system for controlling the frequency of an oscillator over a large number of increments, where the frequencies are in the microwave region, and wherein control of frequency is accomplished by reference to a small number of relatively low frequency oscillators and frequency discriminators.

A further object of the present invention resides in the provision of a frequency control system for a wide band oscillator, wherein the oscillator is programmed to values adjacent desired frequency values by one mechanism, and wherein the programmed values are locked on the true values by a further mechanism.

The above and still further objects, features and advantages of the present invention will become apparent upon consideration of the following detailed description of one specific embodiment thereof, especially when taken in conjunction with the accompanying drawings, wherein:

The single figure of the drawings is a functional block diagram of a system according to the invention.

Referring now more particularly to the accompanying drawings, the reference numerals 10 denotes a crystal controlled oscillator, generating a frequency $F_1$, an exemplary value of which may be 30 mc. The output of oscillator 10 is applied to the input of a gated buffer amplifier 11, normally gated off and having an output channel 12. The output of oscillator 10 is also subjected to cascaded frequency multiplication in frequency tripler 13 and frequency doubler 14 and to mixing of the output of the doubler 14 with the output of oscillator 10 in a mixer 15, to provide frequencies of 90 mc., 150 mc., and 210 mc., i.e. $mF_1$, where $F_1=30$ mc. The output of tripler 13 is applied to a gated 90 mc. buffer amplifier 16, i.e., one of frequency $3F_1$, the output channel of which is 12. The output of the doubler 14, at 180 mc., i.e., $6F_1$, is mixed with the output of oscillator 10 in mixer 15, to produce upper and lower side-bands at 150 mc. and 210 mc., i.e., $5F_1$ and $7F_1$, which are separately selected by gated buffer amplifiers 17 and 18, respectively. The latter are connected to the output channel 12.

The gated buffers 11, 16, 17, 18 may be gated on at will, selectively, or in accordance with a predetermined program, by applying gating signals thereto from a programmer 20 via leads 21, 22, 23, 24, respectively. The programmer 20 may be a mechanical commutator or an equivalent electronic commutator, operative according to a sequence previously inserted, and is conventional per se and for that reason is not described in detail.

By virtue of the operation of elements 10–24 hereinabove described, a predetermined sequence of frequencies selected from the values 30 mc., 90 mc., 150 mc., and 210 mc., i.e. $F_1$, $3F_1$, $5F_1$, $7F_1$, are applied to the channel 12. These frequencies are all locked to the output of oscillator 10. However, within the scope of the invention other multiple frequency generators can be employed, and more or fewer than four frequencies may be utilized.

The wide band voltage tunable microwave generator 30 represents the primary output generator of the system, i.e., the objective of the system is to tune the microwave generator 30 at will and rapidly to any one of a relatively large number of discrete, accurately controlled frequencies $f$, separated by nominal values $n\Delta f$. The output of generator 30 is applied via a directional coupler 31 to a crystal mixer 32. To the latter is also supplied the output of a tunable master oscillator 33, the output frequency F of which may be fixed and remain fixed during operation of the present system, but which may be optionally accurately controlled over a relatively small range of values. A suitable nominal frequency F for the master oscillator 33 is 5000 mc., but it may be frequency controlled at will to have adjacent values, i.e., $F \pm y\Delta a$, where $\Delta a$ is of the order of 0.1 mc. and $y$ represents a series of integers.

The output of mixer 32, equal to the difference of the output frequencies of oscillators 30 and 33, i.e., $f-F$ or $F-f$ depending on whether $f$ or F is larger, is amplified in a wide band amplifier 34 having a pass-band of 3.75 to 236.25 mc. The output of amplifier 34 is applied to a mixer 35, and therein combined to form a difference frequency with the signal present in channel 12, i.e., with one of frequencies $F_1$, $3F_1$, $5F_1$, $7F_1$. Connected to the output of mixer 35 is a relatively narrow band amplifier 36, having a pass-band of 3.75 to 26.25 mc., and the output of the latter amplifier is supplied to an assembly 37 of gated amplifiers, limiters and discriminators, arranged in parallel channels 38, 39, 40, 41. Exemplary center frequencies of the discriminators of these channels are, respectively, 3.75 mc., 11.25 mc., 18.75 mc., and 26.25 mc., i.e. $\Delta f$, $3\Delta f$, $5\Delta f$ and $7\Delta f$. That is to say, the center frequencies of these pass bands are arranged in a series up to $(z-1)\Delta f$. It has been shown that $z$ is equal to 8 in the particular embodiment, so that this equation is satisfied. Except in respect to center frequencies the channels may be identical and accordingly only one typical channel is described in detail.

Considering the channel 38 as typical, it includes a gated amplifier and amplitude limiter 42, in cascade with a dual slope crystal controlled frequency discriminator 43. The latter may include in cascade a broad band discriminator having a frequency response characteristic as illustrated at 44, followed by a narrow band discriminator having a characteristic as illustrated at 45. The composite frequency response characteristic is shown at 46, and includes a broad band portion 47 of small negative slope, with a central portion 48 of sharp negative slope. Thereby, the discriminator is broad band overall, and in this respect imprecise, but provides a very accurate ultimate response, by virtue of the sharp slope of the central portion 48. The gated amplifiers and limiters associated with channels 39, 40, 41, respectively, may be identified by reference numerals 50, 51, 52 and the discriminators by the reference numerals 53, 54, 55.

The outputs of discriminators 43, 53 and 55 and 54 are connected in parallel to a channel 56, which proceeds to an A.F.C. amplifier 57, and therefrom, via a gated polarity reversing amplifier 58, an A.F.C. voltage is applied to control the frequency of tunable microwave generator 30. A positive A.F.C. voltage serves to increase that frequency and a negative A.F.C. voltage to effect a decrease therein. The gated amplifiers 42, 50, 51, 52 are selected at will by programmed control signals supplied by programmer 20 over leads 60, 61, 62, 63, respectively. The polarity of polarity reversing amplifier 58 is selected at will by a programmed signal supplied by programmer 20 via lead 64.

The programmer 20 further supplies, via a staircase programmer voltage supply 70, a series of discrete values of frequency control voltage to the voltage tunable generator 30. The programmer thereby commands the generator 30 to assume, at least approximately, any one of a series of closely spaced frequencies separated by $\Delta f$. It is the function of the remainder of the system to assure that the frequencies so selected and approximately assumed by the generator 30 in response to programmed control voltage are precise and accurate, and are so maintained.

The master oscillator 33 has been described as a reference source for controlling the frequency $f$, which varies by frequency increments $\Delta f$. It is essential that this oscillator be accurately frequency controlled, and such control is effected in the present system by means of an A.F.C. loop. The oscillator 33, which may be a reflux klystron, which is voltage sensitive, supplies its output to a pair of chambers 74, 75, each containing a semi-conductor diode, as 76, 77, coupled to the master oscillator 33. Associated with and coupled to the chambers 74, 75 is a high Q resonant cavity 78. The semi-conductor diode 77 is connected to the input circuit of an I.F. amplifier 79, and the semi-conductor diode 76 is connected to its output circuit. The resonant cavity 78 is tuned to one of the sum and difference of the desired frequency of master oscillator 33 and the frequency of I.F. amplifier 79, which is relatively narrow band, or high Q. For the sake of example, we may assume the desired frequency of the master oscillator 33 to be 5000 mc., and the frequency of the I.F. amplifier 79 to be 30 mc. The resonant cavity 78 may then be tuned to 5030 mc.

If now we assume some output from I.F. amplifier 79 at 30 mc., mixing of this output in diode 76 with the output of the master oscillator 33 at 5000 mc. will provide a sum frequency at 5030 mc. to which the resonant cavity 78 is resonant. The resonant cavity 78 in turn is coupled with the semi-conductor diode 77, which produces a difference frequency of 30 mc. in response to the signal in the resonant cavity, i.e., 5030 mc. and the signal provided by the master oscillator 33, i.e., 5000 mc. The I.F. amplifier may be provided with sufficient gain at its resonant frequency to maintain oscillations, by virtue of the above described process, around the loop consisting of diodes 76, 77, resonant cavity 78, and I.F. amplifier 79, provided the total phase shift around the loop is $2\pi nf$ c.p.s., where $n$ is any integer.

If now the frequency of the master oscillator 33 varies, the total phase shift around the loop is caused to vary because the Q factors of the cavity 78 and the I.F. amplifier 79 are radically different, and it is Q factor which establishes phase shift per cycle per second of frequency change in a resonant circuit. Variation of the total phase shift about the loop causes a compensating change in the frequency of oscillations in the loop, normally at 30 mc. The frequency of oscillations in the loop is thus a function of the frequency of the master oscillator 33, and the relation is such that a very small percentage change in the frequency of master oscillator 33 is reflected as a very large percentage change in loop frequency.

Control voltages supplied to the lead 71 by programmer 20 serve, as described below, to adjust the frequency of reference generator 72 by small increments, intermediate the 3.75 mc. increments otherwise available. For example, five increments of 0.1 mc. each may be provided. These increments are sufficiently small that the available set of discriminator channels 37 is adequate to capture and hold the frequency of generator 30, i.e., the width of the response characteristic 46 of each discriminator is greater than 3.75 mc., which is adequate for the suggested increments.

The tunable reference oscillator 72 includes a crystal controlled oscillator 80, providing 29 mc., connected in cascade with a positively counting counter type frequency discriminator 81. A variable oscillator 82 is provided, which is connected in cascade with a negatively counting counter type frequency discriminator 83. The counter type discriminators 81 and 83 supply voltages corresponding with their counts to the comparator 84, which supplies its difference or error output voltages as an A.F.C. voltage to a reactance tube frequency control circuit 85 associated with oscillator 82. Since the counts of discriminators 81 and 83 are equal while the frequencies of oscillators 80 and 82 are equal, and become relatively greater and smaller according as the frequency of oscillator 80 is below or above the frequency of oscillator 82, the system continuously maintains the frequency of oscillator 82 equal to the frequency of oscillator 80. However, a control voltage can be inserted into either counter, additive of the normal output voltage to the counter, and in such case a fixed frequency difference may be maintained between the outputs of oscillators 80 and 82, which is a function of the control voltage.

The output frequency present on lead 73, equal to the frequency of crystal controlled oscillator 80 plus or minus an increment of frequency affected by control voltage applied to counter 83 over lead 71 from programmer 20, is supplied to a frequency control circuit associated with master oscillator 33.

Output signal provided by I.F. amplifier 79, which is a function of the frequency of master oscillator 33, is supplied to an amplifier 86, which in turn transfers this frequency, nominally 30 mc., to a mixer 87. To the latter is also supplied the output of tunable reference frequency 72, nominally at 29 mc., via a lead 73. The mixer product is supplied to a 1.0 mc. frequency discriminator 88, which supplies A.F.C. voltage to master oscillator 33, in such polarity that constancy of output frequencies of oscillator 33 is maintained.

Any change in reference frequency provided by reference oscillator 72 is reflected as a corresponding variation in output frequency of master oscillator 33. If, for example, the nominal frequency provided by oscillator 72, i.e., 29 mc., be increased by a frequency increment $\Delta a$, the difference frequency applied to discriminator 88 is reduced, and the latter developes a positive A.F.C. voltage for application to master oscillator 33, tending to increase the frequency of the latter. Increase of output frequency of master oscillator 33 effects a corresponding increase in the output of amplifier 79, which continues until amplifier 79 has acquired a frequency increase of $\Delta a$, whereupon the A.F.C. loop comprising discriminator 88 is satisfied. It will be obvious that, if frequency discriminator 88 is to have a zero response point at 1.0 mc., $\Delta a$ must be much smaller than 1.0 mc. In principle, however, other frequency relations than the exemplary ones specified may be employed if larger values of $\Delta a$ are to be permitted.

The values of frequencies which may be scheduled in the exemplary embodiment of the present invention herein described are, where the column headings indicate which one of gated buffers 11, 16, 17, 18 is gated on, as follows:

| 30 mc. | 90 mc. | 150 mc. | 210 mc. |
|---|---|---|---|
| *Mc.* | *Mc.* | *Mc.* | *Mc.* |
| F±3.75 | F±63.75 | F±123.75 | F±183.75 |
| 11.25 | 71.25 | 131.25 | 191.25 |
| 18.75 | 78.75 | 138.75 | 198.75 |
| 26.25 | 86.25 | 146.25 | 206.25 |
| 33.75 | 93.75 | 153.75 | 213.75 |
| 41.25 | 101.25 | 161.25 | 221.25 |
| 48.75 | 108.75 | 168.75 | 228.75 |
| 56.25 | 116.25 | 176.25 | 236.25 |

The values of frequency available at the output of the first mixer 32 are $f-F$ or $F-f$, depending on whether $f$ is greater than or smaller than F. These difference values may be denominated $|\Delta f|$ and $|-\Delta f|$, respectively. The vertical lines in these expressions signify the summation of $\Delta f$ increments which have been generated by the first mixer. That is, $|\Delta f|$ may be $\Delta f$, $3\Delta f$, $5\Delta f$, or any odd multiple of $\Delta f$ up to $63\Delta f$. The second mixer then provides output at frequencies $mF_1-|\Delta f|$ or $$|\Delta f|-mF_1$$

depending on which frequency is greater, $mF_1$ or $|\Delta f|$. In each mixer, then, only subtractive heterodyne products are employed.

Assuming $f>F$, in describing A.F.C. action in the present system, if $|\Delta|f$ is slightly larger than called for by the system $mF_1-|\Delta f|$ will provide a positive error signal and $|\Delta f|-mF_1$ will provide a negative error signal to the A.F.C. loop, since the discriminators have negative slopes with increasing frequency. Oppositely poled A.F.C. voltages are therefore required for these cases, since a positive A.F.C. signal increases $f$ and hence $|\Delta f|$, whereas a negative A.F.C. voltage decreases $f$ and therefore $|\Delta|f$. The outputs of frequency discriminators 43, 53, 54, 55 are required to be positive for positive error signals, and vice versa. Therefore, for the case $f>F$, if $|\Delta|f>mF_1$, and if $|\Delta f|$ is higher than called for by the frequency discriminators, so that the latter provide positively poled output, the latter may be applied with polarity reversal as A.F.C. voltages. On the other hand, for $mF_1>|\Delta f|$ polarity reversal is not required.

If $F>f$, i.e., $|\Delta f|$ is negative, the second mixer again provides outputs $mF_1-|\Delta f|$ or $|\Delta f|-mF_1$. In order to decrease $|\Delta f|$ it is necessary to increase $f$, i.e., to apply a positive A.F.C. voltage to primary generator 30, and alternatively to increase $|\Delta f|$ it is necessary to decrease $f$, by means of a negative A.F.C. voltage.

If $|\Delta f|$ is too great, and if $|\Delta f|>mF_1$, $|\Delta f|-mF_1$ will be too great, a positive voltage will be provided by frequency discriminators 43, 53, 54, 55 and polarity reversal of this A.F.C. voltage is not required, since an increase of $f$ is indicated. Alternatively, for $|-\Delta f|$ too small, polarity reversal of A.F.C. voltage is indicated. An opposite set of conditions obtains for $mF_1>|\Delta f|$.

We have therefore the following sets of conditions:

| $f>F(+|\Delta f|)$ | Reversal | $f<F(-|\Delta f|)$ | Reversal |
|---|---|---|---|
| $|\Delta f|>mF_1$ | yes | $|\Delta f|>mF_1$ | no |
| $|\Delta f|<mF_1$ | no | $|\Delta f|<mF_1$ | yes |

These conditions are met by properly programming the gated polarity reversing amplifier 58.

In order further to explain the operation of the system, by reference to exemplary values of frequency, assume that the frequency of primary generator 30 to be slightly higher than a desired value of 5003.75 mc., say by an increment $\Delta x$. The output of mixer 32 would then be higher than 3.75 by the same increment $\Delta x$, but the output of the mixer 35, equal to $30-(3.75+\Delta x)$ mc., is lower than 26.25 mc. by the increment $\Delta x$. The response of the dual slope discriminator 55 is then positive in polarity. This positive polarity is reversed in gated polarity reversing amplifier 58, and applied as a negative A.F.C. voltage to primary generator 30, reducing the frequency of the latter to its true value, i.e., 5003.75 mc.

For desired values of output frequency of generator 30 equal to 5011.25 mc., the generator 30 is programmed to approximately that frequency. The mixer 32 then supplies an output frequency of 11.25 mc., and the mixer 35 a frequency of $30-11.25=18.75$ mc. The gated amplifier and limiter 51 is programmed into the system, gated polarity reversing amplifier is programmed to polarity reversing condition, and the A.F.C. voltage provided by dual slope discriminator 54 locks the generator 30 on frequency. Analogous operation occurs for frequencies 5018.75 and 5026.25, these frequencies involving, however, dual slope discriminators 53, 43, respectively.

In order to generate a frequency 5033.75, the generator 30 is programmed approximately to that frequency. The mixer 32 now supplies a frequency of 33.75 mc. which combines in mixer 35 with 30 mc. deriving from gated buffer 11 to provide 3.75 mc. for application to discriminator assembly 37. Assume now that the generator 30 is high in frequency by an increment $\Delta x$. The output of mixer 32 will be high by the same increment $\Delta x$, and the output frequency of mixer 35 will likewise be high by increment $\Delta x$, since the latter frequency equals $33.75-30$ mc. Accordingly, the output of dual slope discriminator 43 will be negative, which is the correct polarity for reduction of the increment $\Delta x$ to zero. In this set of circumstances the gated polarity reversing amplifier is programmed to pass A.F.C. voltage without polarity reversal.

By analogous reasoning it can be shown that each of frequencies 5000+(42.25, 48.75, 56.25) may be generated without polarity reversal of A.F.C. voltage.

Should it be desired to programme a frequency of $5000-3.75$ mc. for example, the output of the mixer 35 will be $30-3.75=26.25$ mc. Hence, programming for $5000-3.75$ mc. involves the same reference frequency $mF_1$ and the same frequency discriminator 55 as for 5003.75 mc. Should the output frequency of generator 30 below, i.e., $5000-(3.75+\Delta x)$, however, where the desired frequency is $5000-3.75$ mc. the output of the mixer 32 will be $(3.75+\Delta x)$ mc., and the output of the second mixer $26.25-\Delta x$.

The output of the frequency discriminator 55 will then be positive in polarity, which is the polarity required to raise the frequency of generator 30 until $\Delta x$ becomes zero, and polarity reversal at gated polarity reversing amplifier 58 will not be required.

In general, it may be shown by tracing through polarity requirements for each possible frequency $F\pm|\Delta f|$, where $|\Delta f|$ is given by Table I, that A.F.C. polarity is correct for the first half of each column, and of reversed polarity for the last half, if $f>F$, and that opposite conditions obtain for $F>f$. It may also be shown that, in proceeding down any column of Table I, the dual frequency discriminators to be programmed in circuit are in order, 55, 54, 53, 43, 43, 53, 54, 55.

The operation of the present system remains the same for a small range of frequency variation of master oscillator 33, the programmed frequency increments listed in Table I remaining correct, but the basic frequency with which these frequency increments must be combined to arrive at the programmed frequencies is changed in consonance with the frequency of master oscillator 33. The frequency of master oscillator 33 being F, the frequency of primary generator 30 is $F\pm n\Delta f$, regardless of the value of F, where $n\Delta f$ are the frequency increments listed at Table I. However, considerable discretion must be exercised in selecting frequency values for master oscillator 33, in view of the band-width of frequency discriminator 88 and of the fact that primary generator 30 is programmed by a single programmer designed primarly for only one master oscillator frequency.

Frequency programming of master oscillator 33 may be dispensed with entirely, if desired, without departing from the basic conception on which the present invention depends, and if included in a practical embodiment of the invention may be considered to involve a permissive improvement.

It will be understood that random or progressive output frequency selection may be made in a matter of a few microseconds from any point in the output frequency spectrum to any other point. The system herein shown can be programmed to provide an extremely rapid frequency sweep, so that it is of unique utility for driving a steerable antenna array in a track-while-scan system.

While I have described and illustrated one specific embodiment of my invention, it will be clear that variations of the details of construction which are specifically illustrated and described may be restored to without departing from the true spirit and scope of the invention as defined in the appended claims.

What I claim is:

1. A signal generation system, including a source of signals at frequency F, a generator having a frequency $f$ to be controlled accurately step-wise over a wide range of frequencies by increments $\Delta f$, the frequency F approximating the center frequency of said generator, means for heterodyning the frequency F with the frequency $f$, to provide frequencies $f-F$ or $F-f$, means for providing any one of a plurality of fixed frequencies $mF_1$, where $m$ has values differing only by increments of two, a heterodyne device having an input circuit and an output circuit, means for supplying the selected one of said fixed frequencies and the frequencies $f-F$ or $F-f$ to said input circuit of said heterodyne device for heterodyning therein to provide a frequency equal to the difference between $mF_1$ and $[(f-F)$ or $(F-f)]$, a plurality of frequency discriminators connectable selectively to the output of said heterodyne device, said frequency discriminators having each output voltages of opposite polarities in response to applied frequencies of opposite senses with respect to a predetermined center frequency, the center frequencies of said frequency discriminators having values $n\Delta f$, where $n$ are integers different by a factor of two, and where said center frequencies are lower than the frequency $F_1$ and symmetrically arranged between the frequencies zero and $F_1$, and an automatic frequency control channel coupled from said discriminators to said generator, $\Delta f$ being a common factor of the frequency $mF_1$.

2. A controllable signal generator system including a master oscilllator of frequency F, a generator controllable in respect to frequency $f$ over a wide band of frequencies centered at F, means for obtaining a difference frequency from said generator and master oscillator, a source of accurately controllable frequencies selective from among values $mF_1$, where the values of $m$ are integers differing by two, a heterodyne device having an input and an output, means for coupling said difference frequency and said source to said input to provide further difference frequencies at said output, a plurality of frequency discriminators connectable one at a time to said output, means connected between said discriminators and said generator for supplying automatic frequency control signal to said generator, said frequency discriminators having center point frequencies at $n\Delta f$, where $n$ are odd integers, and where said center point frequencies are distributed symmetrically between zero frequency and frequency $F_1$.

3. In a signal generation system, a master oscillator providing a signal of frequency F, a primary signal generator providing a signal of frequency $f$ centered at F, means responsive to said master oscillator and said primary signal generator for providing signals of frequencies equal to the difference of frequencies F and $f$, respectively, wherein the frequency $f$ may have a wide range of values extending both below and above the frequency F, and wherein the frequency $f$ assumes a multiplicity of discrete valves $F\pm n\Delta f$, where $n$ are integers adjacent ones of which are separated by a factor 2, a source of further frequencies $mF_1$ where $m$ are integers separated by a factor of two, mixer means for deriving heterodyne products of $mF_1$ with said difference of frequencies F and $f$, respectively, and a series of automatic frequency control circuits operatively responsive to said heterodyne products and selectively coupled to said primary signal generator in frequency controlling relation thereto, said automatic frequency control circuits including frequency discriminators having inputs selectively coupled to said mixer means and tuned to a different one of frequencies between 0 and $F_1$ and spaced by $2\Delta f$.

4. The combination according to claim 3 wherein is included a selective polarity inverting element between the output of said frequency discriminators and said primary signal generator.

5. A signal generator comprising:

tunable means for generating signals of a frequency $f$, adjustable by increments or decrements $\pm n\Delta f$, each equal to a fraction of a predetermined reference frequency $F_1$, means for generating signals of a grequency F, a first mixer for heterodyning together the two above-mentioned signals to derive first resultant signals having a frequency equal to $F-(f-n\Delta f)$ or $(f+n\Delta f)-F$, means for generating fixed reference frequency signals of frequencies $F_1$, $3F_1$, $5F_1$, $7F_1$, a second mixer in cascade with the first mixer for heterodyning together a selected one of the fixed reference frequency signals and the first resultant signals, a first amplifying filter having a pass band from 0 to $F_1$ and not wider than $F_1$, a plurality of second amplifying filters each adapted to be selectively coupled to said first amplifying filter and having narrow pass bands and center frequencies of $\Delta f$, $3\Delta f$, $5\Delta f$, and $7\Delta f$, respectively.

a plurality of discriminators individually coupled to said second amplifying filters and having center frequencies of $\Delta f$, $3\Delta f$, $5\Delta f$, and $7\Delta f$, respectively, means for adjusting the tunable means to frequencies of $f\pm n\Delta f$ and simultaneously selectively coupling the appropriate one of said second amplifying filters to said first amplifying filter, means for selecting and applying to the second mixer that one of the reference signals which causes the second resultant signals to be within the pass band of the first amplifying filter, and means for applying to the tunable means as an automatic frequency control potential the output of the selected one of said discriminators with a polarity dependent on whether or not said $n\Delta f$ is greater or less than the frequency of the reference signal being utilized and on whether or not $n\Delta f$ is positive or negative.

6. A signal generator comprising:

tunable means for generating signals at a frequency $f$, adjustable by increments or decrements $\pm n\Delta f$, each equal to a fraction of a predetermined reference frequency $F_1$, means for generating signals of a frequency F, a first mixer for heterodyning together the two above-mentioned signals to derive first resultant signals having a frequency equal to $F-(f-n\Delta f)$ or $(f+n\Delta f)-F$, means for generating fixed reference frequency signals of frequencies $F_1$, $F_1+2z\Delta f$, $F_1+4z\Delta f$, $F_1+6z\Delta f$, etc., where $z$ is an even number, a second mixer in cascade with the first mixer for heterodyning together a selected one of the fixed reference frequency signals and the first resultant signals, a first amplifying filter having a pass band from 0 to $F_1$ and not wider than $F_1$, a plurality of second amplifying filters each adapted to be selectively coupled to said first amplifying filter and having narrow pass bands and center frequencies of $\Delta f$, $3\Delta f$, in a series up to $(z-1)\Delta f$, respectively, a plurality of discriminators individually coupled to said second amplifying filters and having center frequencies of $\Delta f$, $3\Delta f$, in a series up to $(z-1)\Delta f$, respectively, means for adjusting the tunable means to frequencies of $f\pm n\Delta f$ and simultaneously selectively coupling the appropriate one of said second amplifying filters to said first amplifying filter, means for selecting and applying to the second mixer that one of the reference signals which causes the second resultant signals to be within the pass band of the first amplifying filter, and means for applying to the tunable means as an automatic frequency control potential the output of the selected one of said discriminators with a polarity dependent on whether or not said $n\Delta f$ is greater or less than the frequency of the reference signal being utilized and on whether or not $n\Delta f$ is positive or negative.

References Cited in the file of this patent

UNITED STATES PATENTS

| | | |
|---|---|---|
| 2,507,735 | Peterson | May 16, 1950 |
| 2,810,832 | Broadhead | Oct. 22, 1957 |

UNITED STATES PATENT OFFICE

CERTIFICATE OF CORRECTION

Patent No. 3,005,959 October 24, 1961

George Bruck

It is hereby certified that error appears in the above numbered patent requiring correction and that the said Letters Patent should read as corrected below.

Column 2, line 6, for "calues" read -- values --; line 37, for "26.75" read -- 26.25 --; column 3, line 11, for "numerals" read -- numeral --; column 6, lines 50, 57, and 60, for "$|\Delta|f$", each occurrence, read -- $|\Delta f|$ --; column 8, line 40, for "restored" read -- resorted --; line 69, for "frequenc read -- frequencies --; column 9, line 22, for "valves" read -- values --; line 37, for "output" read -- outputs --; line 44, for "grequency" read -- frequency --; same column, line 60, for "respectively," read -- respectively, --.

Signed and sealed this 8th day of May 1962.

(SEAL)
Attest:

ERNEST W. SWIDER
Attesting Officer

DAVID L. LADD
Commissioner of Paten